_(12)_ United States Patent
Hasegawa et al.

(10) Patent No.: US 6,753,621 B2
(45) Date of Patent: Jun. 22, 2004

(54) STARTER FOR INTERNAL COMBUSTION ENGINE

(75) Inventors: Youichi Hasegawa, Kasugai (JP); Yasuo Osawa, Nitta-gun (JP)

(73) Assignees: Denso Corporation, Kariya (JP); Sawafuji Electric Co., Ltd., Tokyo (JP)

( * ) Notice: Subject to any disclaimer, the term of this patent is extended or adjusted under 35 U.S.C. 154(b) by 41 days.

(21) Appl. No.: 10/026,638

(22) Filed: Dec. 27, 2001

(65) Prior Publication Data

US 2002/0103051 A1 Aug. 1, 2002

(30) Foreign Application Priority Data

Jan. 26, 2001 (JP) .................................... 2001-017836

(51) Int. Cl.[7] .............................. H02K 5/10; H02K 5/00
(52) U.S. Cl. ........................ 290/38 R; 290/46; 290/48; 74/7 E; 74/7 R; 310/83; 310/89
(58) Field of Search ................................ 290/48, 38 R, 290/46; 310/83, 89; 74/6–7 E

(56) References Cited

U.S. PATENT DOCUMENTS

| 5,053,633 A | * | 10/1991 | Sugiyama et al. ............ 290/48 |
| 5,156,057 A | * | 10/1992 | Isozumi ........................ 74/7 E |
| 5,307,700 A | * | 5/1994 | Spellman et al. ............. 74/7 R |
| 5,688,203 A | * | 11/1997 | Yamamoto et al. ............ 74/7 E |
| 5,751,070 A | * | 5/1998 | Nagao et al. .................. 290/46 |
| 5,844,336 A | * | 12/1998 | Ohya et al. ...................... 74/6 |
| 5,901,604 A | * | 5/1999 | Sato et al. ................. 290/38 A |
| 6,035,732 A | * | 3/2000 | Ogishima et al. ................ 74/6 |

FOREIGN PATENT DOCUMENTS

JP B2 2847943 11/1998 ............ H02K/5/10

\* cited by examiner

_Primary Examiner_—Karl Tamai
_Assistant Examiner_—Yahveh Comas
(74) _Attorney, Agent, or Firm_—Oliff & Berridge, PLC

(57) ABSTRACT

A starter for an internal combustion engine is comprised of an armature, a motor case, a planetary gear speed reduction mechanism connected to an armature shaft, a frame and a partition plate disposed between the motor case and the frame. The partition plate has an armature-shaft hole and a chamber-connection passage between the armature shaft hole and the armature shaft for connecting the motor chamber and the speed reduction chamber. An undulating circumferential groove is formed between the partition plate and the frame to connect the speed reduction chamber and the outside. A long water drainpipe is removed from a starter for a recreational vehicle.

7 Claims, 2 Drawing Sheets

STARTER FOR INTERNAL COMBUSTION ENGINE

CROSS REFERENCE TO RELATED APPLICATION

The present application is based on and claims priority from Japanese Patent Application 2001-17836 filed Jan. 26, 2001, the contents of which are incorporated herein by reference.

BACKGROUND OF THE INVENTION

1. Field of the Invention

The present invention relates to a starter for driving an internal combustion engine that has a planetary gear speed reduction mechanism.

2. Description of the Related Art

Usually, a starter for a vehicle subjected to water splashing, such as a recreational vehicle, is equipped with a water drainpipe extending from a motor case of the starter, as shown in Japanese Patent 2847943. Recently, since various accessories have been newly introduced into an engine compartment of a car, the space of the engine compartment for a starter has been narrowed. As a result, the water drainpipe may interfere with other accessories if it is too long.

SUMMARY OF THE INVENTION

Therefore, a main object of the invention is to provide an improved starter for a recreational vehicle that does not require a long water drainpipe.

According to a feature of the invention, a starter for an internal combustion engine is comprised of an armature having an armature shaft, a motor case, a planetary gear speed reduction mechanism connected to the armature shaft, a frame for covering the planetary gear speed reduction mechanism and a partition plate forming a motor chamber and a speed reduction chamber. The partition plate has an armature-shaft hole and a chamber-connection passage between the armature shaft hole and the armature shaft to connect the motor chamber and the speed reduction chamber. A long circumferential groove is formed between the partition plate and the frame to connect the speed reduction chamber and the outside.

Therefore, a long ventilation passage is formed to connect the motor chamber, the speed reduction chamber and the outside. Even if the starter is covered with water, water is obstructed by the long ventilation passage.

A seal member may be disposed between the frame and the partition plate to prevent lubrication oil from leaking out from the speed reduction chamber. Preferably, a plurality of projections may project into the circumferential groove to form a labyrinth in the groove, and the circumferential groove opens outside at an outer vent disposed behind a through bolt.

Therefore, the plurality of projections effectively prevents water from getting into the inside of the starter.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A starter according to a first embodiment of the invention is described with reference to FIGS. 1–3A and 3B.

Figure 1:
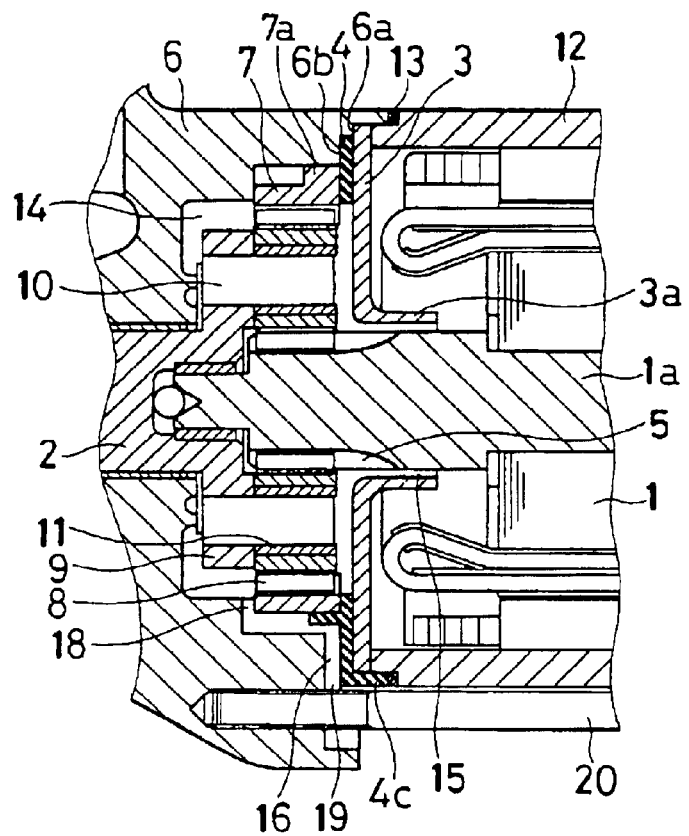
FIG. 1 is a fragmentary cross-sectional side view of a starter according to a first embodiment of the invention.
Figure 2:
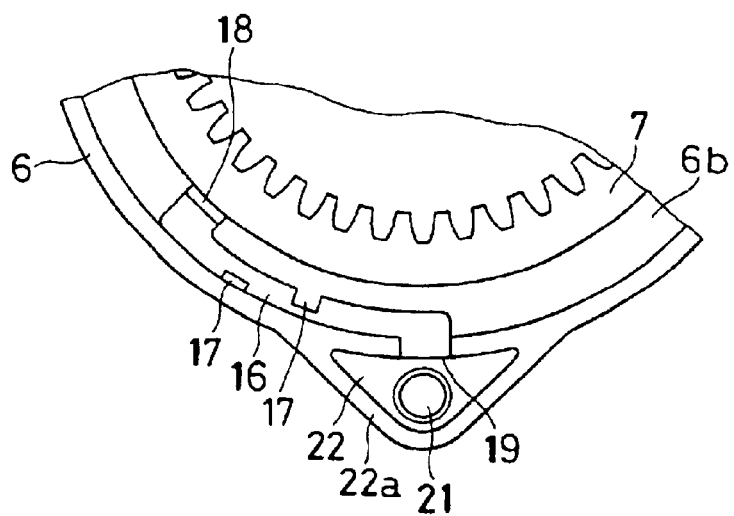
FIG. 2 is a fragmentary rear view of a frame of the starter according to the first embodiment.
Figure 3A:
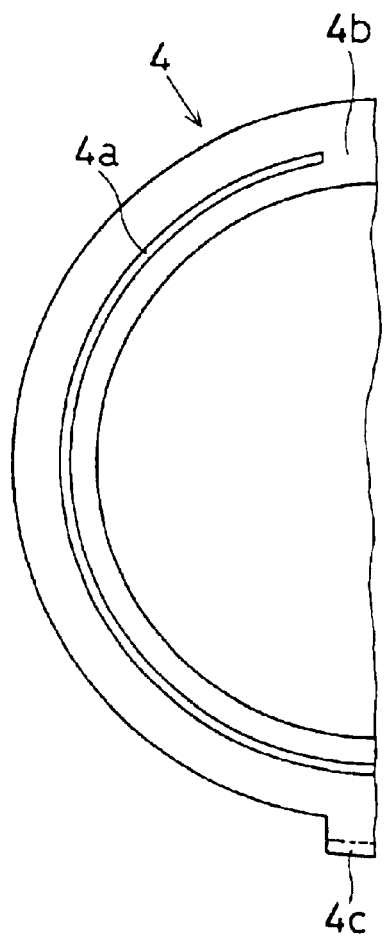
FIG. 3A is a fragmentary plan view of a seal member of the starter according to the first embodiment.
Figure 3B:
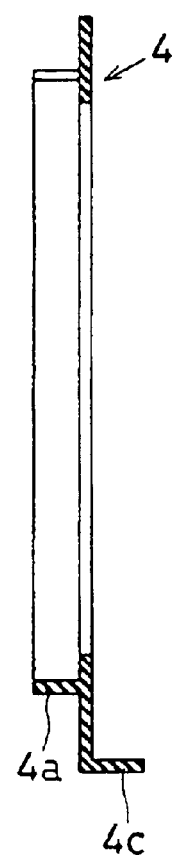
FIG. 3B is a side view of the seal member.

As shown in FIG. 1, the starter is comprised of an armature 1 that has an armature shaft 1a, a planetary gear speed reduction mechanism having an output shaft 2, a partition plate 3, a ring-shaped seal member 4 and a frame 6. The seal member 4 prevents lubrication oil of the speed reduction gear from leaking out.

The speed reduction mechanism is comprised of a sun gear 5 connected to the armature shaft 1a, an internal gear 7 that is fixed to the frame 6, and a plurality of planetary gears 8 in mesh with both the sun gear 5 and the internal gear 7. The output shaft 2 rotates at a speed of a prescribed reduction ratio of the armature shaft, as the plurality of planetary gears 8 revolves around the sun gear 5.

The output shaft 2 is disposed coaxially with the armature shaft 1a. The output shaft 2 has a flanged carrier 9 that has a plurality of pins 10 for rotatably supporting the planetary gears 8 via bearings 11.

The frame 6 is disposed at the front of the starter motor and covers the speed reduction mechanism. The frame 6 is fitted to a yoke or a motor case 12 of the starter motor in the axial direction, sealed by an O-ring 13 and fastened to the starter motor by a plurality of through bolts 20 and female screws 21 formed at a flange 22 of the frame 6.

The partition plate 3 divides the inside space of the starter into two chambers, a speed reduction chamber 14 and a motor chamber to shelter the speed reduction mechanism from worn brush powder of the starter motor. The partition plate 3 has a cylindrical portion 3a at the center thereof, through which the armature shaft 1a extends from the motor chamber into the speed reduction chamber 14. The peripheral portion of the partition plate 3, together with the seal member 4, is sandwiched between an end of the yoke 12 and a peripheral end 6a of the frame 6. The partition plate 3 can be integrated with the yoke 12.

The motor chamber and the speed reduction chamber 14 are connected to each other by a cylindrical connection passage 15 that is formed between the cylindrical portion 3a and the armature shaft 1a. The speed reduction chamber 14 is connected to the outside of the starter by a circumferential groove 16 that is formed on the frame 6. The groove 16 may be formed on the seal member 4, or any surface of the plate 3 and frame 6 that abut each other. Thus, a ventilation passage extending from the motor chamber, through the connection passage 15, the speed reduction chamber 14 and the groove 16, to the outside or the atmosphere is formed so that gas exhaled in the motor chamber can be discharged to the outside.

The ring-shaped seal member 4, which is made of rubber or the like, is disposed within the peripheral end 6a of the frame 6 between a depressed surface 6b of the frame 6 and the partition plate 3. The seal member 4 has an upright cylindrical wall 4a, as shown in FIG. 3, and the internal gear 7 is fitted into the cylindrical wall 4a so as to be correctly positioned in the radial direction. The seal member 4 has an opening 4b at a portion of the cylindrical wall 4a, through which a projection 7a of the internal gear extends, and a radially projecting hook portion 4c disposed at the peripheral portion thereof opposite the opening 4b.

The groove 16 is formed at the surface 6b of the frame 6 in the circumferential direction thereof. A plurality of projections 17 projects into the groove 16 and forms an undulating passage or a labyrinth. The groove 16 connects the speed reduction chamber 14 via an inner air vent 18 that is formed at the inside surface of the frame 6 and the outside via an outer air vent 19. The outer air vent 19 is formed at the flange 22 behind the through bolt 20 so that the through bolt 20 can block off water. The outer air vent 19 may be formed by drilling at a position along the groove 16 to fit different types of cars. The hook portion 4c is located opposite the outer air vent 19 so that the edge of the hook portion 4c abuts the end of the yoke 12 via an O-ring 13.

If the starter is covered with water, water gets into the groove 16 from the outer air vent 19. However, the plurality of projections 17 forms a labyrinth and prevents water from getting into the speed reduction chamber 14. It is not necessary to provide a long water drainpipe. Further, the starter motor has an air passage that connects the connection passage 15, the speed reduction chamber 14, the groove 16 and the outside. Therefore, the motor chamber can be always ventilated.

Figure 4:
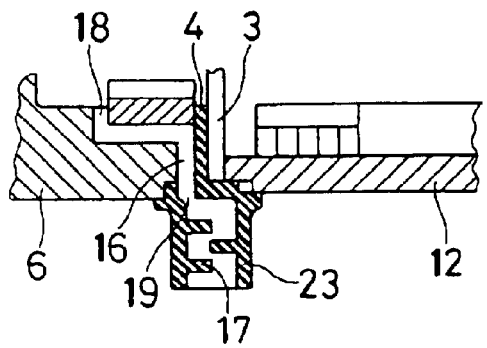
FIG. 4 is a water drainpipe of a starter according to a second embodiment of the invention.

A starter according to a second embodiment of the invention is described with reference to FIG. 4. The same reference numeral as the first embodiment corresponds to the same or substantially the same part or component, hereafter.

The starter according to the second embodiment has a short water drainpipe 23 that is integrated with the seal member 4. The groove 16 and the drainpipe 23 having a plurality of projections 17 block out water even if water covers the starter by accident.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A starter for an internal combustion engine, comprising:

an armature having an armature shaft;

a motor case for accommodating said armature;

a planetary gear speed reduction mechanism connected to said armature shaft at an end of said armature shaft;

a frame, coupled with said motor case, for covering said planetary gear speed reduction mechanism; and a partition plate, disposed between said motor case and said frame, for forming a motor chamber and a speed reduction chamber;

wherein said partition plate has an armature-shaft hole and a chamber-connection passage between said armature shaft hole and said armature shaft for connecting said motor chamber and said speed reduction chamber, and a circumferential groove is formed at a peripheral portion of said frame between said partition plate and said frame to connect said speed reduction chamber and the outside, thereby forming a ventilation passage extending from said motor chamber through said speed reduction chamber to the outside.

2. The starter as claimed in claim 1, further comprising a seal member, disposed between said frame and said partition plate, for preventing lubrication oil from leaking out from said speed reduction chamber.

3. The starter as claimed in claim 1, wherein a plurality of projection projects into said circumferential groove to form a labyrinth.

4. The starter as claimed in claim 1, further comprising a through bolt for fastening said motor case to said frame, wherein said circumferential groove opens outside at an outer vent disposed behind said through bolt.

5. The starter as claimed in claim 4, wherein said frame has a cylindrical wall and a flange having a female screw for said through bolt, and said outer vent is disposed behind said cylindrical wall.

6. The starter as claimed in claim 1, wherein said outer vent is opened by drilling.

7. The starter as claimed in claim 2, further comprising a water drainpipe connected to said circumferential groove and integrated with said seal member.

* * * * *